UNITED STATES PATENT OFFICE.

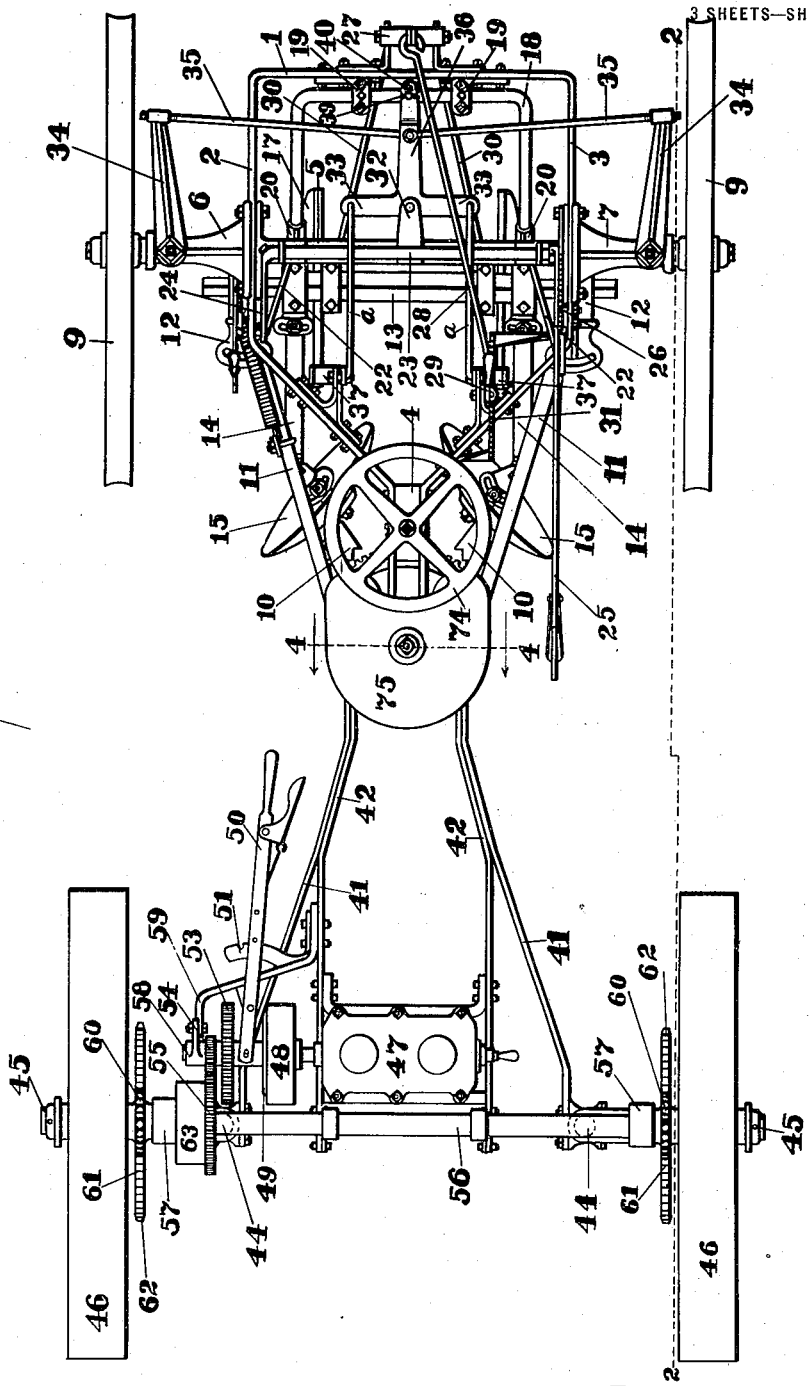

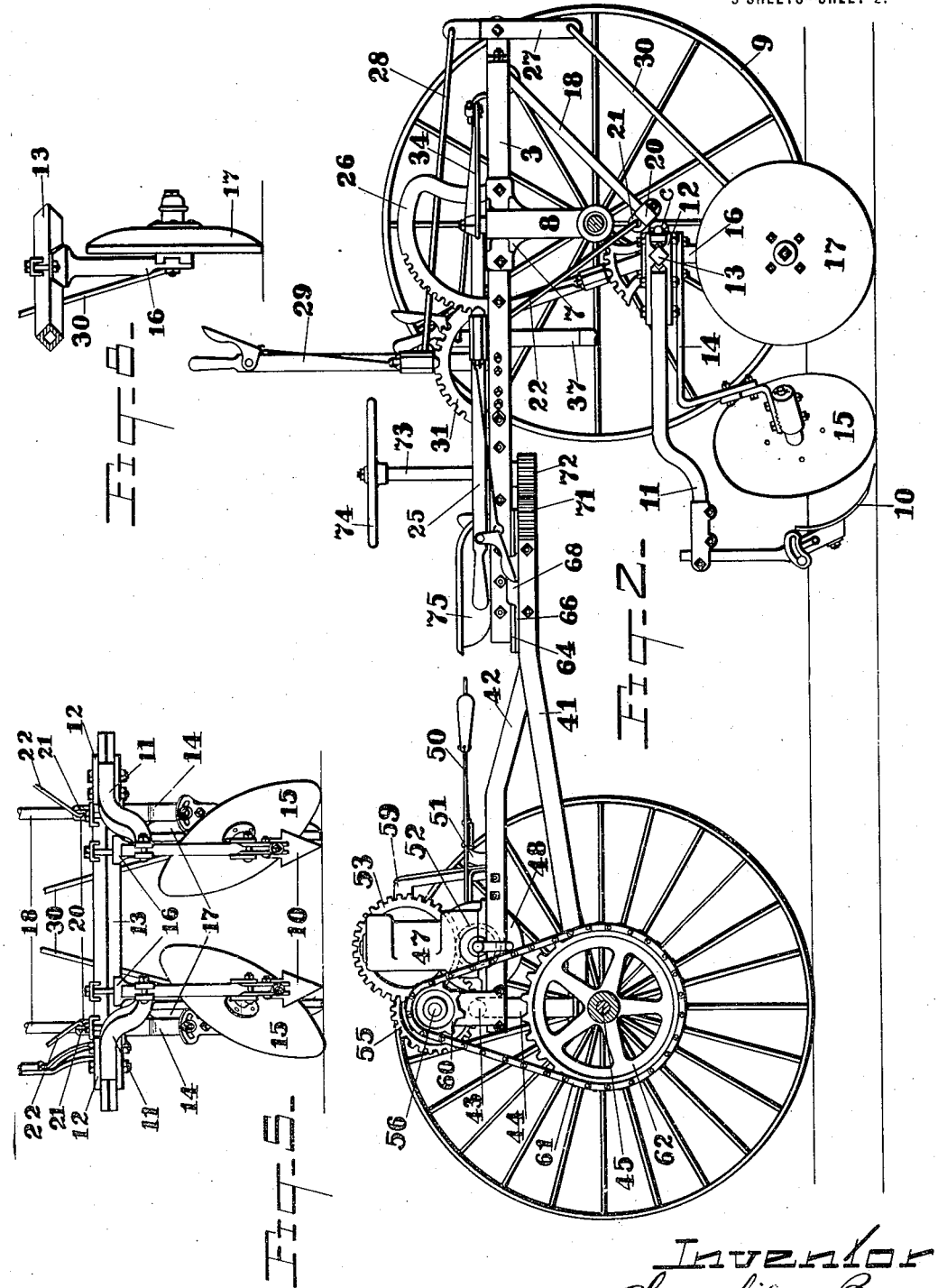

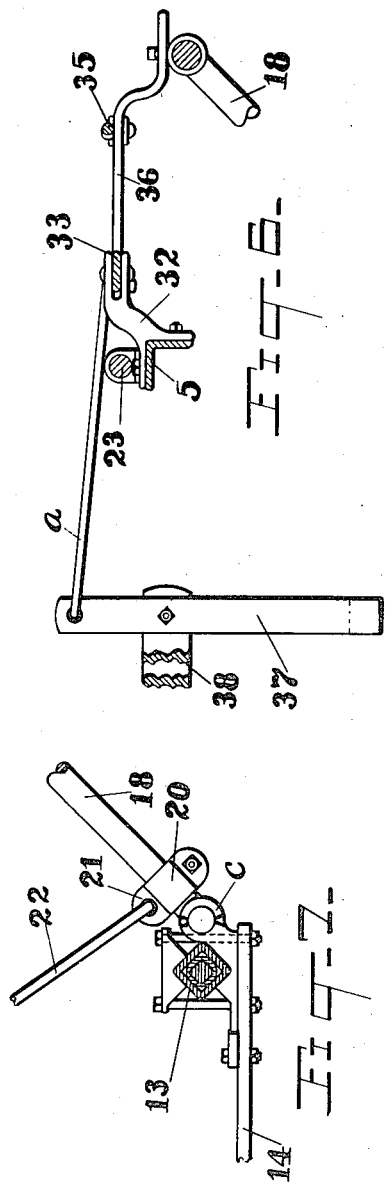
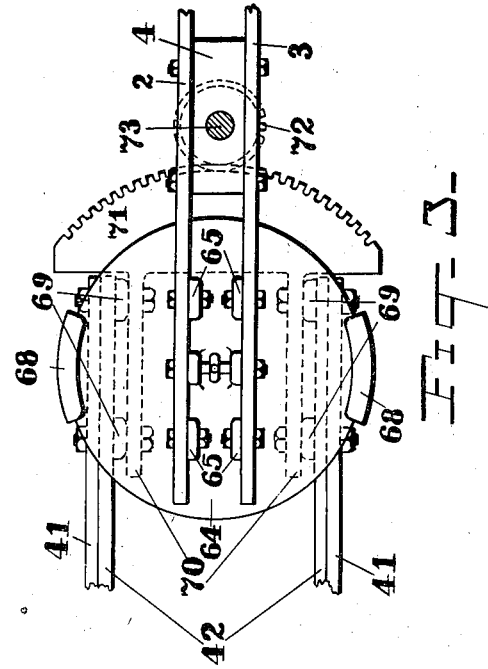
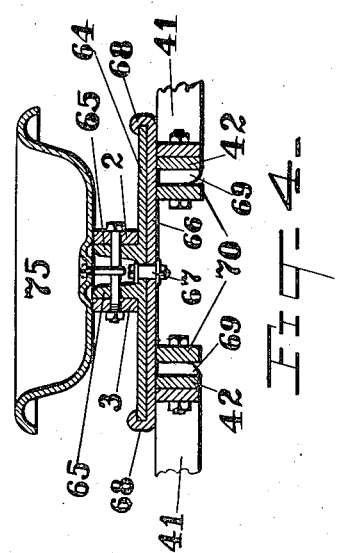

THEOPHILUS BROWN, OF MOLINE, ILLINOIS, ASSIGNOR TO DEERE AND COMPANY, OF MOLINE, ILLINOIS, A CORPORATION OF ILLINOIS.

LISTER-MOTOR CULTIVATOR.

1,426,544.  Specification of Letters Patent.  Patented Aug. 22, 1922.

Application filed March 23, 1917. Serial No. 156,996.

*To all whom it may concern:*

Be it known that I, THEOPHILUS BROWN, a citizen of the United States, residing at Moline, in the county of Rock Island and State of Illinois, have invented certain new and useful Improvements in Lister-Motor Cultivators, of which the following is a specification, reference being had therein to the accompanying drawing.

My invention relates to improvements in tractors, especially tractors used in propelling tools employed to stir or turn over the soil between rows of growing plants, and which is dirigible so as to be sharply turned, or deflected from a given line of advance to follow irregularities in the rows.

One of the objects of my invention is to produce a tractor, of the type alluded to, embodying steering devices by which it can be steered by the hand or foot of the operator, or automatically guided by the contact of a certain part of the mechanism with the ground as will be hereinafter clearly set forth.

Referring to the drawings in which similar numerals indicate identical parts—

Figure 1 is a plan view of my improved tractor.

Figure 2 is a section on the line 2—2 of Figure 1.

Figure 3 is a detail plan of one of the steering devices.

Figure 4 is a section in detail on the line 4—4 of Figure 1.

Figure 5 is a rear elevation of part of the cultivating mechanism.

Figure 6 is a detail of a foot lever and connections, and

Figures 7 and 8 are details.

The main frame or supporting element comprises two sections, a rear section, on which the motive power is supported, and a front section carrying the earth working devices. The front section includes a frame formed preferably from a single bar and having a forward transverse portion 1 from which extend, rearwardly, side bars 2 and 3 which, at a desired point, are bent to converge to a block 4 to which they are rigidly connected. A transverse bar 5 extends between the side bars 2 and 3 and is rigidly bolted thereto.

Mounted on the side bars 2 and 3 are brackets 6 and 7 having vertical bearings 8 in which are journaled the spindle portions of crank axles on the laterally extending parts of which the supporting wheels 9 are mounted.

In the drawings are shown earth working tools consisting of shovels 10 attached to drag bars or beams 11, the latter being secured to a bracket member 12 mounted on a transverse shaft 13. Drag bars 14 are mounted on brackets on the shaft 13 and carry disks 15. Standards 16 are securely clamped to the shaft 13 and revolubly mounted on the free ends thereof are bell-wheels 17; the free bell-wheels 17 have their convex surfaces disposed to contact with the sides of a furrow or trench and acting as guides to aid in a proper line of work and to assist both in carrying the earth working tools and in regulating their depth of operation. The parts just described are well known in the art and the manner of their assembly can be varied if desired.

Secured forwardly to the brackets to which the drag bars 14 are connected, are eyes $c$ in which are hooked the ends of an arch 18 which is slidably supported, to move laterally, in bearings 19 on the bar 1. On the arch 18 adjacent the ends thereof, are split collars 20, clamped in place by bolts and provided with eyes 21 in which are hooked the ends of rods 22.

Rockably mounted on the bar 5 is a shaft 23 having at one end a rearwardly extending arm 24 to the end of which one of the rods 22 is secured; to the opposite end of the shaft 23 I rigidly secure a lever 25 to which is connected the other of the rods 22. The lever 25 is provided with the usual type of latch to engage with any one of a series of notches in a segment 26 secured on the side bar 3, and is operable to raise or lower the shaft 13 and consequently the earth working tools and the bell wheels 17.

Pivotally supported intermediate its length on the front of the main frame is a rocking member 27, having its upper end connected, by a link 28 with a lever 29 mounted on the side bar 3, and its lower end connected with the standards 16 respectively by links 30. The links 30 have a parallel relation with the side bars of the arch 18 so that when the lever 25 is operated to raise the shaft 13 and connected earth working parts the latter are always in the same relative position with the ground. The lever 29 is provided with the ordinary type of latch to engage with a rack 31 secured on the side bar 3, and by operation of the lever 29 and the lever 25 the depth of cultivation is regulated.

Centrally on the transverse bar 5 is secured a forwardly extending bracket 32, on which is pivotally mounted a three arm bell crank lever, the laterally projecting arms 33 of which are connected respectively by links *a* to foot levers 37 supported on brackets 38 which are secured on the bars 2 and 3; the forwardly extending arm 36 of the bell crank lever is connected by links 35 to forwardly extending arms 34 secured on the upper ends of the vertical spindle portions of the wheel axles. The arm 36 is also connected, adjacent its extremity, to the transverse portion of the arch 18 by a pin 39 which is secured through a slot 40 in the arm 36.

By actuating the foot levers 37 motion is transmitted through the links *a* to the arms 33 of the bell crank lever, and the arm 36 of the latter, through the links 35 simultaneously vibrates the arms 34, and the spindles to which they are secured, which results in turning the wheels to the right or left and causes a more or less deflection of the front end of the machine at the same time the gangs of cultivating devices are shifted through the connection of the arm 36 with the arch 18 slidably mounted in the bearings 19.

If the conditions of the work are such that a lateral shifting bodily of the gangs of cultivating devices is not required, and the steering resulting from turning the wheels 9 is sufficient, the gang shifting devices can be set to move with the frame only by withdrawing the pin 39 and tightening the bearings 19.

The rear section of the main frame comprises the following parts. 41, 41 are bars diverging rearward and inclined somewhat downward. 42, 42 are bars that similarly diverge rearward, but extend upward toward the rear. The front end parts of these bars 41 and 42 are joined rigidly together, as shown in Figure 3, and are also joined to the devices which connect the two frame sections together. The rear frame section includes an arched axle 43 which is carried high enough to pass over the plants. The vertical parts of the rear arch are indicated by 44, and at their lower ends, these are preferably formed integrally with spindles 45 upon which are mounted the traction ground wheels 46. The rear ends of the lower bars 41 are rigidly secured to the vertical parts 44 of the axle; the bars 42 are rigidly secured by suitable brackets to the upper part of the arch.

A motor 47 is suitably supported, preferably upon the rear portions of the bars 42. The motor shaft has a fly-wheel carrying, or formed as one element of, the friction clutch at 48. The second element 49 of the clutch is controlled by the hand lever 50 which is locked in any position desired by a thumb latch, detent and notched segment 51.

A pinion 52 on the motor shaft is actuated thereby when the clutch is closed. This pinion meshes with a gear 53 on a shaft above the motor shaft, the gear 53 or shaft carrying a pinion 54 which meshes with a gear 55 on a cross shaft 56 mounted in bearings 57 secured to the upper part of the arched axle 43. The motor shaft 58 and the wheels thereon are supported by a bracket 59 rigidly connected to one of the frame bars 42.

Sprocket wheels 60, on the cross shaft 56, are connected by chain 61 with sprocket wheels 62 on the traction wheels 46.

A compensating or differential gear 63, of any well known or suitable sort, is interposed between the pinion 54 and the sprocket wheels 60. As shown, this compensating gear is on the shaft 56 and is composed of suitable elements by which the power transmitted to the gear 55 will be imparted equally to the traction wheels, but with differential speeds, according to circumstances.

The forward ends of the longitudinal bars 41 and 42, as above stated, are connected with the rear ends of the bars 2 and 3 of the front frame section, and in the following manner:

A circular plate 64 is provided on its upper surface with lugs 65 to which the rear ends of the bars 2 and 3 are securely bolted; the plate 64 is supported and adapted to turn on a similar plate 66 to which it is pivotally connected by a bolt 67. Diametrically opposite each other on the plate 66 are flanges 68 overlapping the plate 64, forming guides for the latter so that it is securely held in position relative to the plate 66. The forward ends of the bars 41 and 42 are bolted to lugs 69 on the under side of the plate 66.

Rigidly secured to the lugs 69, between the bars 42, by the same bolts which secure the bars 42 in place, are rearwardly extending arms 70 of a horizontally disposed arcuate rack 71, the teeth of which mesh with a pinion 72 mounted on the lower end of a vertical shaft 73 which is journaled to rotate in the block 4. On the upper end of the shaft 73 is a hand wheel 74 by the actuation of which the operator can steer the machine from his seat 75 mounted on the plate 64.

Assuming that the machine is being used for cultivating plants growing in rows; the motor is first started and the operator, if in his seat, can start or stop the movement of the machine by the lever 50 and the friction clutch. As the machine moves forward the operator has complete control of its direction. If the path along which he should advance is approximately straight, and deviates only from a straight line at intervals he causes the machine to deflect from such line to follow the shift variations in the rows, by means of the foot levers 37. If, however, there is considerable irregularity, or if the necessary deflection of the rows from a straight line are wide, and he finds it necessary to throw the tools, during short periods of time, over relatively long distances, he connects the tool shifting devices with the front steering mechanism by means of the pin 39; and then the act of guiding the tools toward the plants simultaneously angles the front wheels and deflects the front end of the machine. In either case, he automatically leads the rear ground wheels or traction devices in the direction to be traveled.

When it becomes necessary to turn the machine completely around, as for instance, at the end of a row of plants so as to travel in the opposite direction, the operator inclines the front frame section to the rear frame section by turning the hand wheel 74 in the proper direction, causing the pinion 72 and the rack 71 to bring the frame sections to an angle with each other toward the right or left, as desired. This causes the axes of the wheels under the front section to assume a position inclined to the axes of the wheels of the rear section. And by angulating the lines of the two frame sections to a considerable extent, he can turn the machine on curves of short radii.

The extent to which he can, by the foot levers, angulate the front wheels is limited; but if he supplements this by angulation of the frame sections, made possible by the hinging and by the power devices at 71 and 72, he can shorten the radii of the curves on which the front end of the mechanism turns.

When the machine has been brought around toward the position for traveling in the opposite direction, the action of the hand wheel is reversed, operating the pinion 72 and rack 71 to bring the frame sections again into alinement, and their parts are ready again to be steered and manipulated through the foot levers.

When it is desired, however, that the earth working tools shall swing only with the frame, I withdraw the pin 39, and tighten the bearings 19 to hold the arch supported thereby, from sliding; withdrawing the pin 39 severs the connection between the foot lever actuated steering mechanism and the earth working tools so that the wheels only are moved in the desired direction by operation of the foot levers by again connecting the arm 36 to the arch 18 by reinserting the pin 39, and loosening the bearings 19 so that the arch 18 is again free to slide thereon, the earth working tools are again guidable simultaneously with the wheels.

My device is automatically steerable however in the following manner, the earth working tools and the wheels 9 being connected to be guided simultaneously in the desired direction.

Assuming that the operator has removed his feet from the foot levers and his hands from the wheel 74, or that he is out of his seat, and the machine is traveling between rows of growing plants, the bell wheels 17, traveling between opposite rows, presenting convex sides to the slanting sides of the furrow and thereby prevented from riding up over the latter, will follow the irregularities of the furrow line and at the same time shift the earth working tools in conformity therewith, the arch 18 sliding freely in the bearings 19. If the arm 36 is connected, at this time, to the arch 18 by the pin 39 it is obvious that when the bell wheels and connected earth working tools are shifted the wheels 9 will be shifted to travel in the same direction, and as the rear section of the machine is controlled, as to direction of travel, by the front section, the machine, it will be seen, is controlled automatically by the bell wheels 17.

If, however, the pin 39 is removed and the bearings 19 loosened so that the arch 18 will be free to slide therein, then the earth working tools only will be automatically shiftable laterally by the bell wheels following the sides of the furrow, the wheels 9 must then be angled by actuation of the foot levers, ordinarily however, when the pin 39 is removed so that the arch 18 is automatically adjusted in the manner stated, and independently of the wheel adjustment, the wheels 9 travel in a straight line, the bell wheels and connected earth working tools automatically deviating therefrom only when the furrow line is irregular.

The subject matter herein claimed is that involving the structural feature of automatically steering the power propelled implement. I have in other applications shown some of the matters herein illustrated, namely No. 108,500, filed July 10, 1916; No. 156,995, filed March 23, 1917, (issued April 4, 1922, as Patent 1,411,476); No. 178,389, filed July 3, 1917, and No. 389,063, filed June 15, 1920. But do not herein claim any of the subjects matter presented in the claims of any of said applications, preferring herein, as above stated, to present claims relating to the automatic steering of the implement.

What I claim is—

1. A power propelled tillage implement comprising a frame, dirigible wheels supporting the front of the frame, wheels supporting the rear of the frame, a motor on the frame having connections by which power is transmitted to the wheels, tillage devices connected to the frame, two vertically rotatable wheels adapted to be shifted bodily laterally relatively to the frame and to bear horizontally against the ground in two opposite directions simultaneously, and means connecting the last said wheels to the dirigible wheels for automatically oscillating the latter laterally and positively.

2. A power propelled tillage implement, comprising a frame, dirigible wheels supporting the front of the frame, wheels supporting the rear of the frame, a motor on the frame having connections by which power is transmitted to the wheels, tillage devices connected to the frame, means operable at will to steer the dirigible wheels, two vertically rotatable wheels adapted to be shifted bodily laterally relatively to the frame and to bear horizontally against the ground in two opposite directions simultaneously, and means connecting the last said wheels to the dirigible wheels for automatically oscillating the latter laterally and positively.

3. A power propelled tillage implement, comprising a frame, dirigible wheels supporting the front of the frame, wheels supporting the rear of the frame, a motor on the frame having connections by which power is transmitted to the wheels, tillage devices connected to the frame, means to steer the dirigible wheels to simultaneously move the front of the frame and the tillage devices laterally, two vertically rotatable wheels adapted to be shifted bodily laterally relatively to the frame and to bear horizontally against the ground in two opposite directions simultaneously, and means connecting the last said wheels to the dirigible wheels for automatically oscillating the latter laterally and positively.

4. A power propelled tillage implement, comprising a frame, dirigible wheels supporting the front of the frame, a wheel supporting the rear of the frame, a motor on the frame having connections by which power is transmitted to a wheel, tillage devices connected to the frame, manually operable means to steer the dirigible wheels to move the frame laterally, manually operable means to move the tillage devices laterally, means to connect both manually operable means to simultaneously move the frame and the tillage devices laterally, and means operable by contact with the ground to move the tillage devices laterally when the manually operable means are disconnected.

5. A power propelled tillage implement, comprising a frame including a front section and a rear section, dirigible wheels supporting the front section, wheels supporting the rear section, a motor on the frame having connections by which power is transmitted to the last said wheels, tillage devices connected with the front section of the frame, steering devices manually operated to cause the implement to move laterally, two vertically rotatable wheels adapted to be shifted bodily laterally relatively to the frame and to bear horizontally against the ground in two opposite directions simultaneously, and means connecting the last said wheels to the dirigible wheels for automatically oscillating the latter laterally and positively.

6. A power propelled tillage implement, comprising a frame including a front section and a rear section, dirigible wheels supporting the front section, wheels supporting the rear section, a motor on the frame having connections by which power is transmitted to the rear wheels, tillage devices connected with the front section of the frame, steering devices manually operable to swing the dirigible wheels to move the front section and tillage devices laterally, and ground engaging means operable to automatically move the front section and tillage devices in a lateral direction.

7. A power propelled tillage implement, comprising a frame including a front section and a rear section, dirigible wheels supporting the front section, wheels supporting the rear section, a motor on the frame having connections by which power is transmitted to the rear wheels, tillage devices connected with the front section of the frame, steering devices manually operable to swing the dirigible wheels to move the front section and tillage devices laterally, and ground engaging means to automatically move the tillage devices in a lateral direction.

8. A power propelled tillage implement, comprising a frame including a front section and a rear section pivotally connected, dirigible wheels supporting the front section, wheels supporting the rear section, a motor on the rear section having connections by which power is transmitted to the rear wheels, tillage devices connected with the front section of the frame, manually operable means to steer the dirigible wheels to swing the front section of the frame laterally, manually operable means to move the tillage devices laterally, means to connect both manually operable means to simultaneously move the frame and the tillage devices laterally, and means operable by contact with the ground to simultaneously move the front section of the frame and the tillage devices in a lateral direction.

In testimony whereof I affix my signature, in presence of two witnesses.

THEOPHILUS BROWN.

Witnesses:
   JESSIE SIMSER,
   W. G. DUFFIELD.